United States Patent
Kim

(10) Patent No.: US 9,189,665 B2
(45) Date of Patent: Nov. 17, 2015

(54) ANTI-COLLISION COUPLING FOR CONTACTLESS CARDS

(75) Inventor: Yong-Wook Kim, Hwasung-si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 1360 days.

(21) Appl. No.: 12/952,772

(22) Filed: Nov. 23, 2010

(65) Prior Publication Data

US 2011/0062233 A1 Mar. 17, 2011

Related U.S. Application Data

(62) Division of application No. 11/301,549, filed on Dec. 13, 2005, now abandoned.

(30) Foreign Application Priority Data

Jan. 3, 2005 (KR) .............................. 2005-0000278

(51) Int. Cl.
| | |
|---|---|
| G06K 7/08 | (2006.01) |
| G06K 19/00 | (2006.01) |
| H04Q 5/22 | (2006.01) |
| G06K 7/10 | (2006.01) |
| G06K 7/00 | (2006.01) |

(52) U.S. Cl.
CPC .......... *G06K 7/10019* (2013.01); *G06K 7/0008* (2013.01); *G06K 7/10029* (2013.01); *G06K 7/10069* (2013.01); *G06K 7/10079* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,686,513 | A * | 8/1987 | Farrar et al. | 340/571 |
| 6,010,074 | A | 1/2000 | Kelly et al. | |
| 6,010,075 | A * | 1/2000 | Ishifuji et al. | 235/492 |
| 6,321,982 | B1 * | 11/2001 | Gaultier | 235/380 |
| 6,456,191 | B1 * | 9/2002 | Federman | 340/10.2 |
| 6,469,618 | B1 * | 10/2002 | Gaultier | 340/10.3 |
| 6,508,400 | B1 * | 1/2003 | Ishifuji et al. | 235/382 |
| 6,588,670 | B2 * | 7/2003 | Bukowski | 235/462.45 |
| 6,646,543 | B1 | 11/2003 | Mardinian et al. | |
| 6,848,616 | B2 * | 2/2005 | Tsirline et al. | 235/449 |

(Continued)

FOREIGN PATENT DOCUMENTS

| | | |
|---|---|---|
| DE | 10055602 | 7/2001 |
| DE | 10227558 | 1/2004 |

(Continued)

*Primary Examiner* — Daniel Walsh
(74) *Attorney, Agent, or Firm* — F. Chau & Associates, LLC

(57) ABSTRACT

Contactless cards and a corresponding anti-collision coupling method are provided, where the method includes requesting that the cards transmit their unique identifiers that each include a fixed number of bytes, receiving the unique identifiers simultaneously as byte-wise positive pulses, counting the received positive pulses, and determining that more than one card responded if the number of received positive pulses exceeds the fixed number of bytes; and where the contactless cards each include a unique identifier having a number of bytes, a receiver for receiving an anti-collision command indicative of a desired identifier byte, a comparator in signal communication with the receiver for comparing the desired identifier byte with a corresponding byte of the unique identifier, and a transmitter responsive to the comparator for transmitting the unique identifier as byte-wise positive pulses if the desired identifier byte matches the corresponding byte of the unique identifier.

16 Claims, 9 Drawing Sheets

(56) References Cited

U.S. PATENT DOCUMENTS

| | | | |
|---|---|---|---|
| 7,049,933 B1* | 5/2006 | Koerner | 340/10.1 |
| 7,274,284 B2* | 9/2007 | Dressen | 340/10.2 |
| 7,429,912 B2* | 9/2008 | Tanaka et al. | 340/10.1 |
| 8,174,368 B2* | 5/2012 | Usami | 340/10.4 |
| 8,786,408 B2* | 7/2014 | Chang | 340/10.2 |
| 2001/0014090 A1* | 8/2001 | Wood, Jr. | 370/348 |
| 2001/0035823 A1* | 11/2001 | Curwen et al. | 340/573.4 |
| 2002/0149480 A1* | 10/2002 | Shanks et al. | 340/572.1 |
| 2002/0175806 A1* | 11/2002 | Marneweck et al. | 340/10.33 |
| 2003/0179077 A1* | 9/2003 | Hartmann et al. | 340/10.2 |
| 2004/0066279 A1* | 4/2004 | Hughes et al. | 340/10.1 |
| 2004/0082918 A1* | 4/2004 | Evans et al. | 604/207 |
| 2004/0178267 A1* | 9/2004 | Tsirline et al. | 235/449 |
| 2005/0039014 A1* | 2/2005 | Sajkowsky | 713/172 |
| 2005/0045723 A1* | 3/2005 | Tsirline et al. | 235/451 |
| 2005/0058292 A1* | 3/2005 | Diorio et al. | 380/270 |
| 2005/0092838 A1* | 5/2005 | Tsirline et al. | 235/449 |
| 2005/0151654 A1* | 7/2005 | Curwen | 340/573.4 |
| 2005/0231326 A1 | 10/2005 | Enrico | |
| 2005/0285739 A1* | 12/2005 | Velhal et al. | 340/572.1 |
| 2006/0017544 A1* | 1/2006 | Tanaka et al. | 340/10.2 |
| 2006/0017545 A1* | 1/2006 | Volpi et al. | 340/10.4 |
| 2006/0022042 A1* | 2/2006 | Smets et al. | 235/451 |
| 2006/0144943 A1* | 7/2006 | Kim | 235/451 |
| 2006/0145817 A1* | 7/2006 | Aikawa et al. | 340/10.3 |
| 2006/0175406 A1* | 8/2006 | Dressen | 235/451 |
| 2006/0209781 A1* | 9/2006 | Wood, Jr. | 370/347 |
| 2006/0213994 A1* | 9/2006 | Faiz et al. | 235/462.05 |
| 2006/0220859 A1* | 10/2006 | Nagai et al. | 340/572.1 |
| 2006/0232384 A1* | 10/2006 | Yang | 340/10.2 |
| 2006/0255131 A1* | 11/2006 | Stewart | 235/383 |
| 2006/0273881 A1* | 12/2006 | Yang et al. | 340/10.2 |
| 2006/0290508 A1* | 12/2006 | Moutchkaev et al. | 340/572.1 |
| 2007/0028049 A1* | 2/2007 | Yang et al. | 711/122 |
| 2007/0200710 A1* | 8/2007 | Feltz et al. | 340/572.7 |
| 2008/0283600 A1* | 11/2008 | Seo et al. | 235/439 |
| 2010/0182128 A1* | 7/2010 | Kim et al. | 340/10.2 |
| 2011/0205015 A1* | 8/2011 | Finkenzeller et al. | 340/5.8 |
| 2011/0210828 A1* | 9/2011 | Sun et al. | 340/10.2 |
| 2012/0313761 A1* | 12/2012 | Rolin et al. | 340/10.5 |

FOREIGN PATENT DOCUMENTS

| | | |
|---|---|---|
| FR | 2760280 | 9/1998 |
| FR | 2774495 | 8/1999 |
| FR | 2788858 | 7/2000 |
| JP | 10126308 A | 5/1998 |
| JP | 2001168759 A | 6/2001 |
| JP | 2004038621 A | 2/2004 |
| KR | 20040036117 | 4/2004 |
| WO | 03/034632 A2 | 4/2003 |
| WO | 2004090800 | 10/2004 |

* cited by examiner

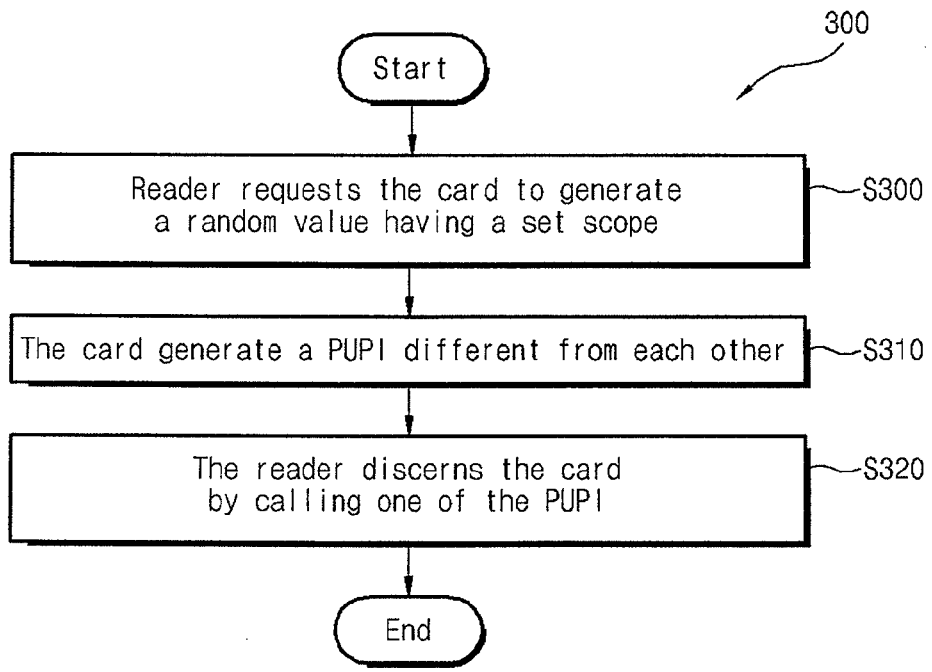
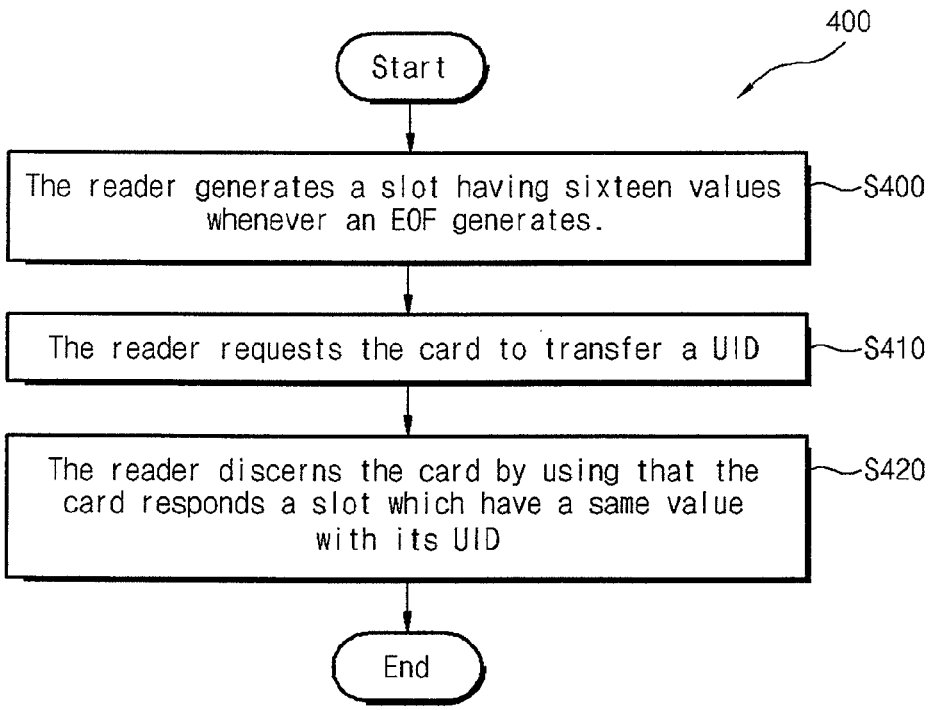

ANTI-COLLISION COUPLING FOR CONTACTLESS CARDS

CROSS-REFERENCE TO RELATED PATENT APPLICATION

This application is a divisional of application Ser. No. 11/301,549, filed Dec. 13, 2005 now abandoned, which claims priority to Korean Patent Application No. 10-2005-0000278, filed on Jan. 3, 2005, the disclosures of which are each incorporated herein by reference in their entireties.

BACKGROUND OF THE INVENTION

The present disclosure relates to contactless interface devices, and more particularly relates to anti-collision coupling for contactless interface devices. An anti-collision coupling for contactless interface devices is provided.

Contactless integrated circuit (IC) cards and radio frequency (RF) identification (RFID) cards are types of contactless interface devices known as contactless cards. In such contactless cards, an interface coupling or information exchange may be accomplished when the contactless cards come within range of a contactless card reader.

If more than one contactless card approaches a reader at the same time, there may be confusion in the reader because of multiple concurrent signals from each card. To alleviate such confusion, an anti-collision interface coupling method is used to identify the cards that approach the reader.

The anti-collision coupling methods for contactless cards are typically divided into close coupling methods and remote coupling methods, according to the desired approach distance between a card and a reader. In addition, the remote coupling methods are typically divided into proximity, vicinity and RF methods.

An example of a close coupling method (CICC) is set forth in the ISO 10536 standard, as known in the art. Examples of proximity coupling methods (PICC) are set forth in the ISO/IEC 14443 standard, as also known in the art. An example of a vicinity coupling method (VICC) is set forth in the ISO/IEC 15693 standard, as further known in the art.

The PICC methods defined in the ISO/IEC 14443 standard include a type A coupling method and a type B coupling method. For the type A method, the anti-collision method of the contactless cards that satisfy the ISO 14443 type A standard make use of a Unique Identification (UID), which each card has separately. When the contactless cards approach an effective region of the reader, the contactless cards each generate a signal to indicate their presence, the reader requests a card to transfer its UID, the card transfers the UID to the reader by unit, and the reader identifies the card by comparing the UID separately. The ISO 14443-A standard uses a UID method and a bit collision method, where the card is required to respond within a precise response time. Unfortunately, it takes the card a long time to respond because of the bit unit identification required within each card.

For the type B method, the anti-collision method of the contactless cards that satisfy the ISO 14443 type B standard makes use of an optional value called a Pseudo Unique Proximity card Identifier (PUPI), which each card generates separately. When the contactless cards approach an effective region of the reader, the reader requests the cards to generate a random value having a set scope, the cards each generate PUPI values different from each other, and the reader selects a card by calling one of the received PUPI values. In the ISO 14443-B standard, the card must generate a random value within a fixed range and the reader must generate slots. Unfortunately, this process takes a long time because of the card operation required within each card.

For the vicinity method, the anti-collision method of the contactless cards that satisfy the ISO 15693 standard makes use of a Unique Identification (UID), which each card has separately. When the contactless cards approach an effective region of the reader, the reader generates a slot having sixteen values whenever an EOF occurs. The reader requests a card to transfer a UID and recognizes the card by noting that the card responds to a slot that has the same value as its UID. The ISO 15693 standard uses a UID method, where the reader must make 16 slots. The card responds to the corresponding slot when the UID is in accord with the slot. The card compares its UID with the slots 0 to 16, and counts the slot whenever the EOF occurs. Unfortunately, this process takes a long time because of the card operation required within each card. Thus, conventional methods for anti-collision coupling suffer from the disadvantage that a complex arithmetic operation is required within each card. The above and other drawbacks and disadvantages of the prior art are addressed by an anti-collision coupling for contactless cards in accordance with exemplary embodiments of the present disclosure.

SUMMARY OF THE INVENTION

Contactless cards and a corresponding anti-collision coupling method are provided. An exemplary embodiment anti-collision coupling method includes requesting that contactless cards transmit their unique identifiers that each include a fixed number of bytes, receiving the unique identifiers simultaneously as byte-wise positive pulses, counting the received positive pulses, and determining that more than one card responded if the number of received positive pulses exceeds the fixed number of bytes.

Exemplary embodiment contactless cards include a unique identifier having a number of bytes, a receiver for receiving an anti-collision command indicative of a desired identifier byte, a comparator in signal communication with the receiver for comparing the desired identifier byte with a corresponding byte of the unique identifier, and a transmitter responsive to the comparator for transmitting the unique identifier as byte-wise positive pulses if the desired identifier byte matches the corresponding byte of the unique identifier.

These and other features of the present disclosure will become apparent from the following description of exemplary embodiments, which is to be read in connection with the accompanying drawings.

BRIEF DESCRIPTION OF THE DRAWINGS

The present disclosure presents an anti-collision coupling for contactless cards in accordance with the following exemplary figures, in which:

FIG. 3 shows a schematic block diagram for a communication method of contactless cards that meets the ISO/IEC 14443 type B standard;

FIG. 4 shows a schematic block diagram for a communication method of contactless cards that meets the ISO/IEC 15693 standard;

DETAILED DESCRIPTION OF PREFERRED EMBODIMENTS

Figure 1:
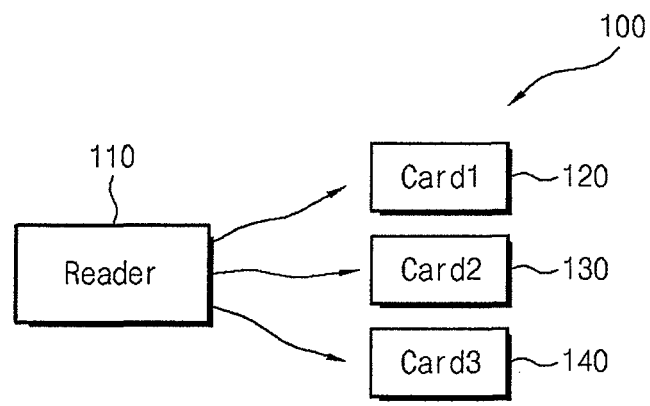
FIG. 1 shows a schematic block diagram for a communication between a contactless card and a reader.

The present disclosure relates to contactless integrated circuit (IC) cards and radio frequency (RF) interface devices (RFID), and more particularly relates to anti-collision methods for interfacing such cards and devices. An exemplary method is used to identify a number of contactless IC or RFID cards associated with a reader by using a unique identification (UID) of each of the cards when a plural number of cards approach the reader. The method identifies each card to prevent collisions between the cards without requiring complex arithmetic operations by the cards. As shown in FIG. 1, a conventional communication system between a reader 110 and contactless cards 120, 130 and 140 is indicated generally by the reference numeral 100. If more than one contactless card is approaching the reader, confusion may arise in the reader because of concurrent signals from the cards to the reader. An anti-collision method is used to identify the cards that approach the reader in an effort to prevent such confusion.

Figure 2:
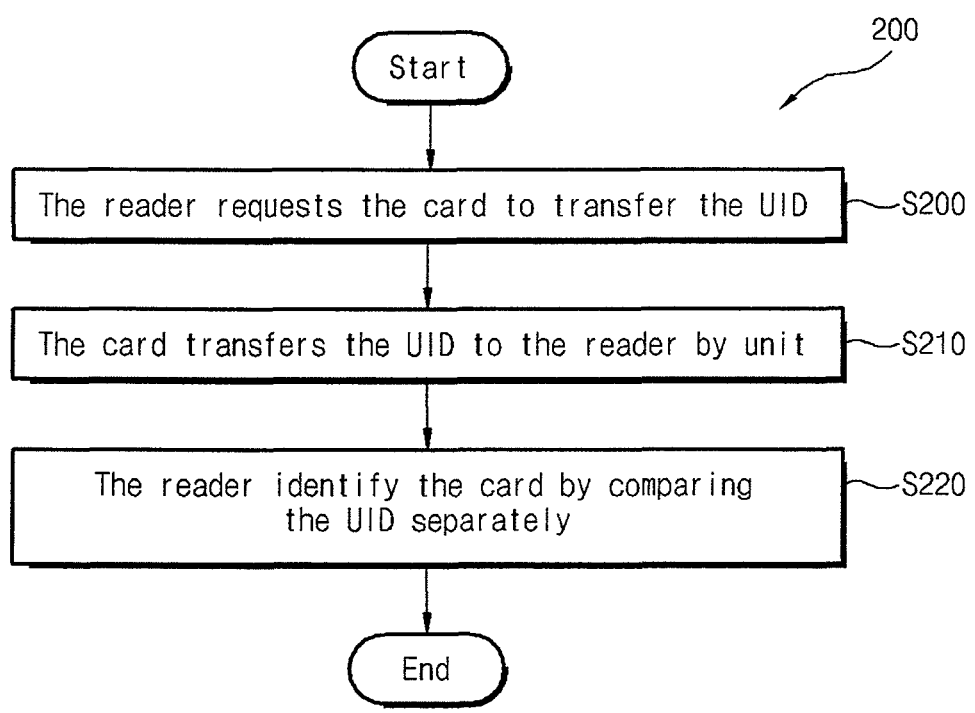
FIG. 2 shows a schematic block diagram for a communication method of contactless cards that meets the ISO/IEC 14443 type A standard.

Turning to FIG. 2, a conventional communication method for contactless cards that satisfies the ISO/IEC 14443 type A standard is indicated generally by the reference numeral 200. The anti-collision method 200 makes use of a Unique Identification (UID), which each card has separately. Here, the UID may be an 8-byte value using a bitwise comparison. When the contactless cards approach an effective region of the reader, the contactless cards generate a signal to alert the reader to their presence. The reader requests the card to transfer the UID at step S200. The card transfers the UID to the reader by unit at step S210. The UID is transmitted bitwise in the shape of negative pulse modulation on a center frequency using Manchester coding and bit operations. Here, the probability of a bit collision between corresponding bits from two different cards is 1 in 2 or 50%. The reader identifies the card by comparing the UID separately at step S220. This ISO 14443-A method uses a UID method and a bit collision method, where the card is required to meet a precise response time. Unfortunately, the bit unit identification is time consuming and bit collisions for multiple cards are obscured by the central frequency.

Turning now to FIG. 3, a conventional communication method for contactless cards that satisfies the ISO/IEC 14443 type B standard is indicated generally by the reference numeral 300. The anti-collision method 300 makes use of an optional value, which is called a Pseudo Unique Proximity card Identifier (PUPI) and which each card generates separately. The PUPI is a single-byte randomized value corresponding to a slot. When the contactless cards approach an effective region of the reader, the reader requests the cards to each generate a random value having a set scope at step S300. The cards generate a PUPI different from each other at step S310. The reader discerns the card by calling one of the PUPI identifiers at step S320. This ISO 14443-B method requires the card to make a random value within a fixed range and requires the reader to make slots. Unfortunately, the card operation is time consuming.

As shown in FIG. 4, a conventional communication method for contactless cards that satisfies the ISO/IEC 15693 standard is indicated generally by the reference numeral 400. The anti-collision method 400 makes use of a UID, which each card has separately. When the contactless cards approach an effective region of the reader, the reader generates a slot having sixteen values whenever an EOF occurs at step S400. The reader requests the card to transfer a UID at step S410. The reader discerns the card by detecting that the card responds a slot that has the same value as its UID at step S420. This ISO 15693 method uses a UID method and requires the reader to make 16 slots. The card must respond to the corresponding slot when the UID is in accord with the slot. Thus, the card compares its UID with the slots 0 through 16, and counts the slot whenever the EOF occurs. Unfortunately, the card operation is time consuming.

Figure 5:
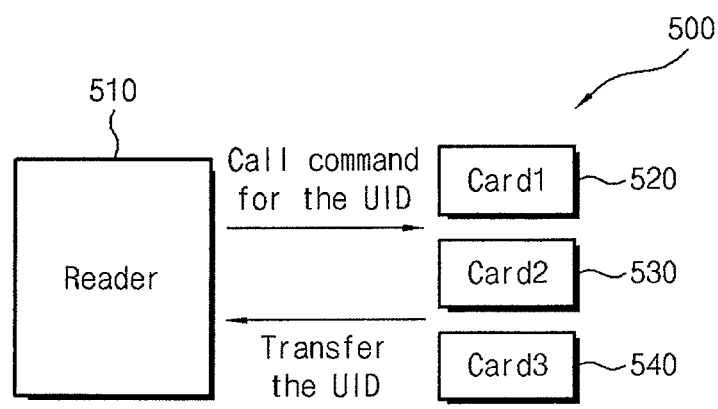
FIG. 5 shows a schematic block diagram for a communication method of contactless cards in accordance with an exemplary embodiment of the present disclosure.

Turning to FIG. 5, a communication system embodiment of the present disclosure is indicated generally by the reference numeral 500. The system 500 includes a reader 510 and contactless cards 520, 530 and 540. Each contactless card has its own peculiar UID. When the contactless cards approach an effective range of the reader, the reader generates a command to call for the UIDs of the cards. The cards simultaneously transfer their respective UIDs to the reader per byte, where each byte is in the shape of a positive pulse. Unlike the negative pulses of the prior art, the positive pulses of the present embodiment prevent the values from becoming obscured. Here, the probability of a byte collision between a corresponding byte from two different cards is 1 in 256 or about 0.4%.

Figure 6:
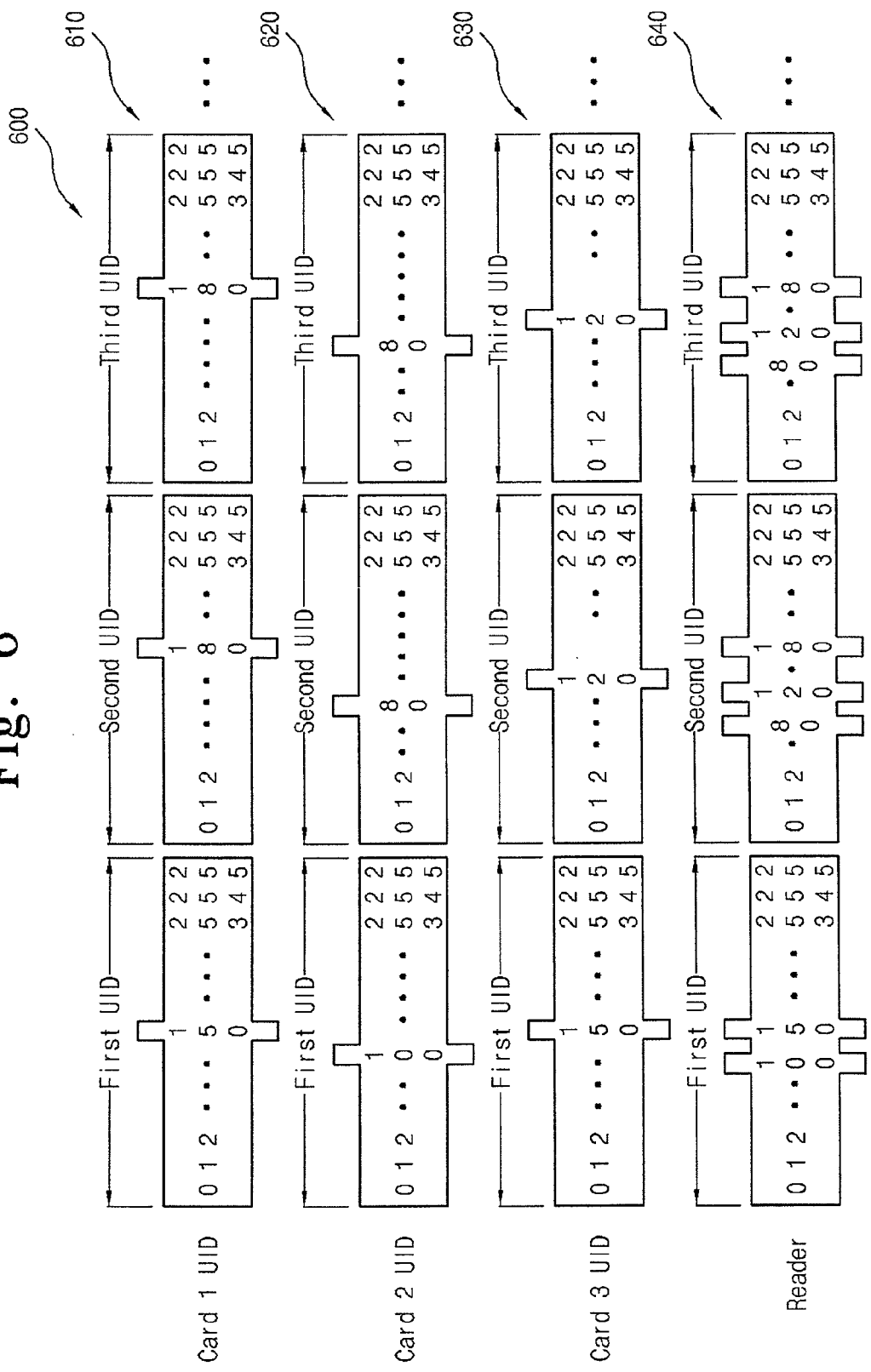
FIG. 6 shows a schematic signal diagram for transferring and receiving card identifications with positive pulses in accordance with FIG. 5.

Turning now to FIG. 6, signals for transferring and receiving card identifications with positive pulses are indicated generally by the reference numeral 600. The signals 600 show how each card that received a call command transfers its UID to the reader in shape of the positive pulse. Card 1 transfers its UID 610 to the reader, Card 2 transfers its UID 620 to the reader, and Card 3 transfers its UID 630 to the reader. The reader receives the composite UID signal 640, in which the bytes of the card UIDs are individually detectable by detecting the positive pulses.

Thus, each card that receives the call command transfers its UID to the reader as positive pulses. The UID 610 of Card 1 includes a first UID byte value of 150, a second UID byte value of 180 and a third UID byte value of 180. The UID 620 of Card 2 includes a first UID byte value of 100, a second UID byte value of 80 and a third UID byte value of 80. The UID 630 of Card 3 includes a first UID byte value of 150, a second UID byte value of 120 and a third UID byte value of 120. The composite UID signal 640 at the reader includes first UID byte values of 100 and 150, second UID byte values of 80, 120 and 180, and third UID byte values of 80, 120 and 180.

Figure 7:
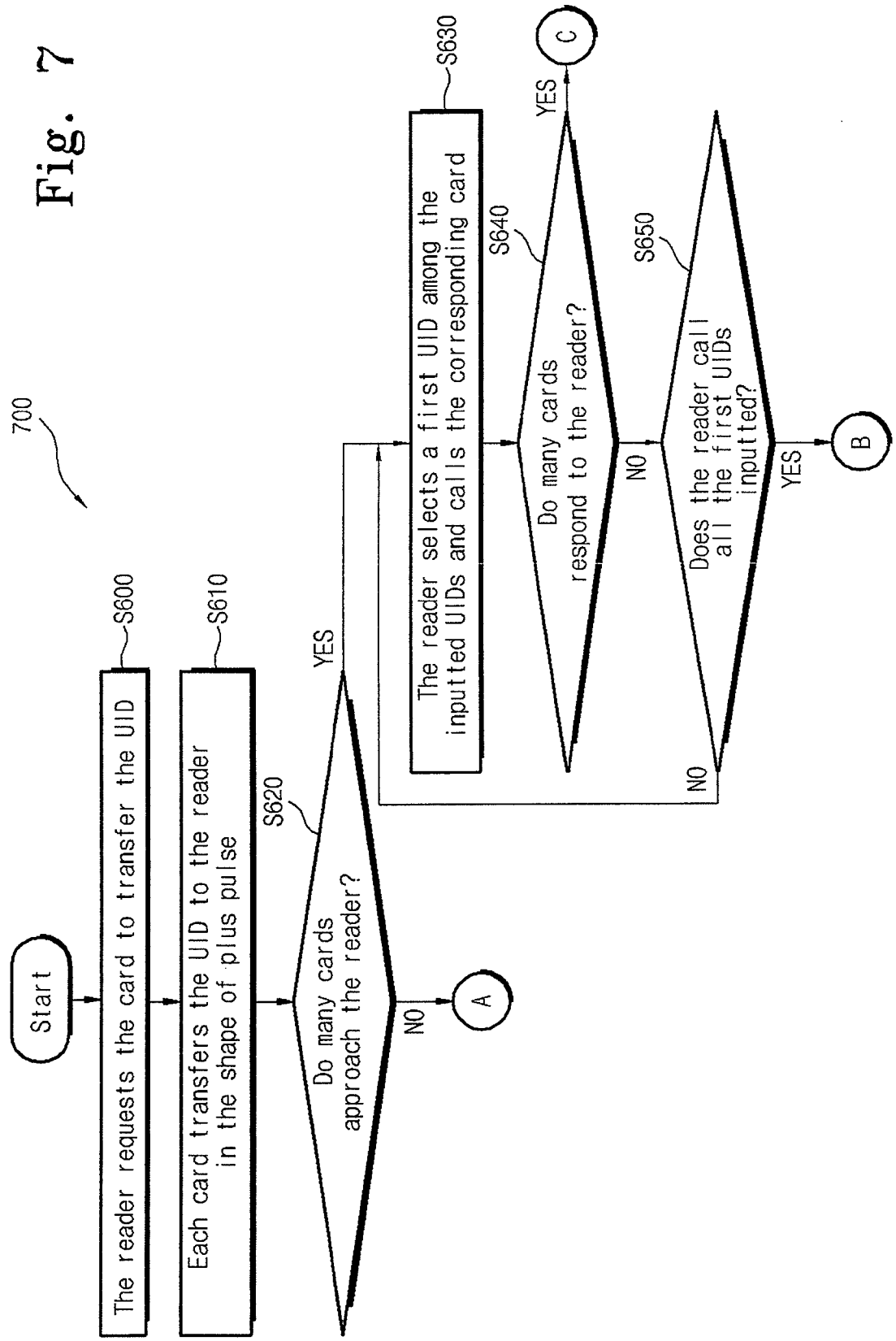
FIGS. 7 and 8 show a schematic flow diagram for an anti-collision method using card identification in accordance with FIG. 5.
Figure 8:
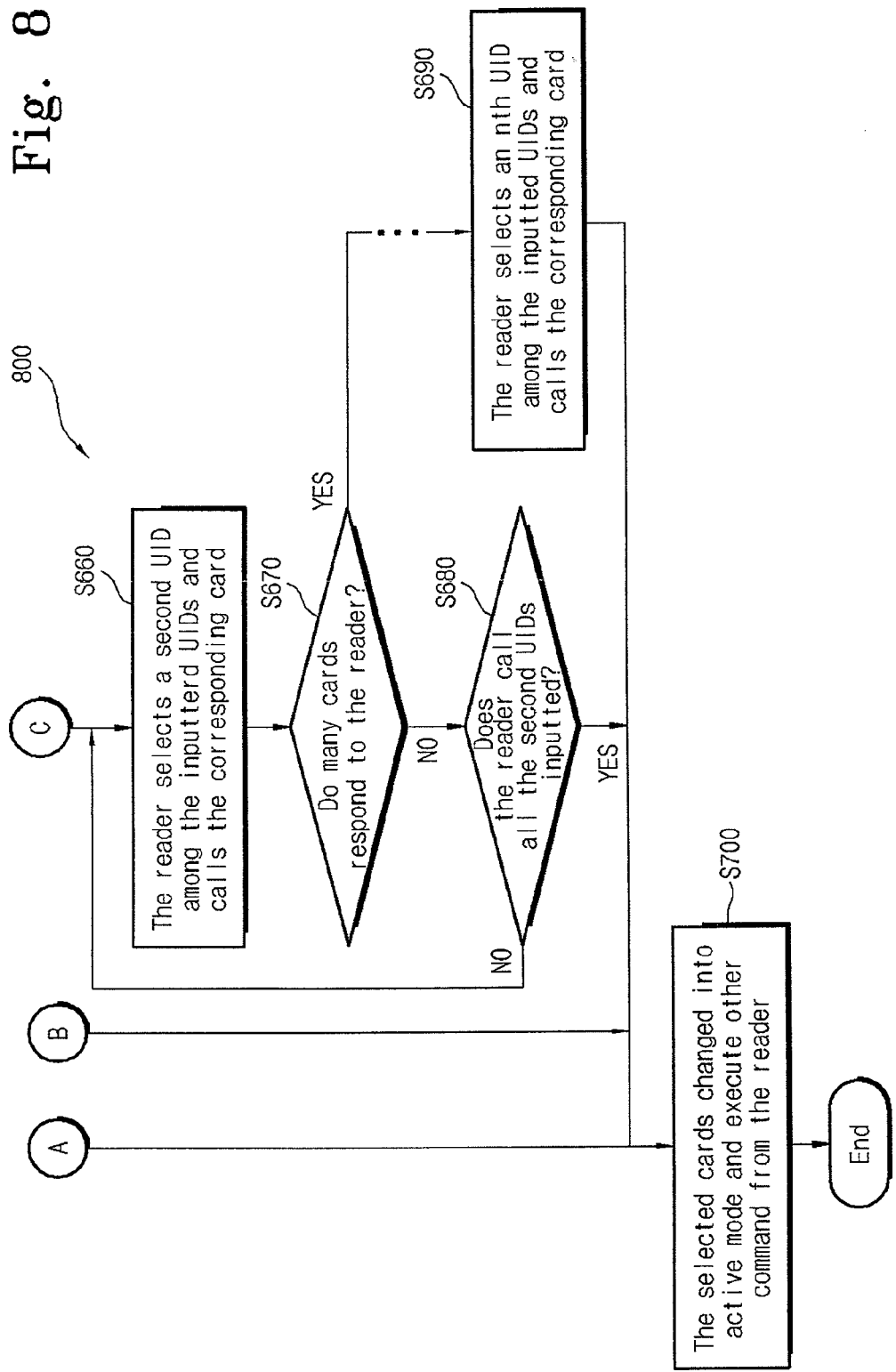

As shown in FIGS. 7 and 8, an anti-collision method using card identification is indicated generally by the reference numerals 700 and 800. The method 700 includes a function block S600, at which the reader requests the cards to transfer the UIDs. That block passes control to a function block S610, at which each card transfers the bytes of its UID to the reader, each UID byte in the shape of a positive pulse. That block, in turn, passes control to a decision block S620, which determines if more than one card approaches the reader. If only one card approaches, that card is selected and control passes to a function block S700, at which the selected card or cards are activated and other commands from the reader may be executed. If more than one card approaches, control is passed from block S620 to a function block S630, at which the reader selects a first card's first UID byte from the received first UID bytes and calls the corresponding card. That block passes control to a decision block S640, which determines if more than one card responds to the reader. If only one card responds, control is passed to another decision block S650, which determines if the reader has called all of the first UID bytes received in the composite signal. If the reader has not yet called all of the first UID bytes, control is passed back to the function block S630. If, on the other hand, the reader has already called all of the first UID bytes, control is passed to the function block S700.

If the decision block S640 determines that more than one card responds to the reader, control is passed to a function block S660, at which the reader selects a second UID byte from among the second UID bytes received in the composite UID and calls the corresponding card. That block passes control to a decision block S670, which determines if more than one card still responds to the reader. If only one card responds to the reader, the block S670 passes control to another decision block S680, which determines if the reader has called all of the second UID bytes received in the composite UID signal. If the reader has not yet called all of the second UID bytes, control is passed back to the function block S660. If, on the other hand, the reader has already called all of the second UID bytes, control is passed to the function block S700.

If the decision block S670 determines that more than one card still responds to the reader, control passes to a function block S690. At the function block S690, which represents a recursive loop duplicating steps S630 through S650 or S660 through S680 for up to an nth UID byte (e.g., n=3, 4, 5 . . . ), the reader selects an nth UID byte from among the nth UID bytes received in the composite UID signal and calls the corresponding card. The function block S690 passes control to the function block S700.

Figure 9:
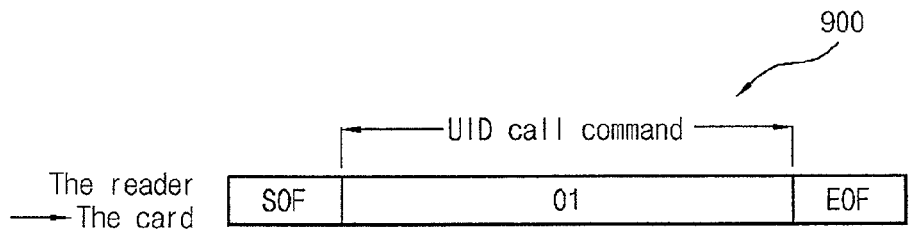
FIG. 9 shows a schematic signal diagram for a call command from the reader to nearby cards in accordance with FIG. 5.

Turning now to FIG. 9, a signal for a call command from the reader to nearby cards is indicated generally by the reference numeral 900. Here, the signal 900 includes a UID call command. The reader 510 of FIG. 5 generates the UID call command to call for the UIDs of the contactless cards 520, 530 and 540 when the contactless cards approach an effective region of the reader, where each contactless card has its own peculiar UID.

The signal 900 further includes a start and an end using a Start of Frame (SOF) and an End of Frame (EOF), respectively. The reader 510 transfers the SOF and the UID call command and the SOF when the contactless cards 520, 530 and/or 540 approach the reader.

Figure 10:
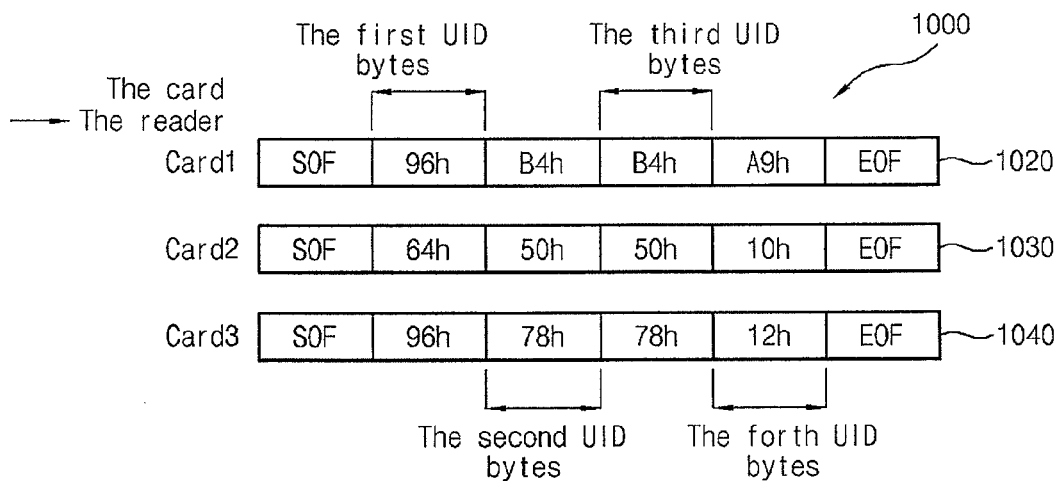
FIG. 10 shows a schematic signal diagram for responses from the nearby cards to the reader in accordance with FIG. 9.

As shown in FIG. 10, signals for responses from the nearby cards to the reader are indicated generally by the reference numeral 1000. These card signals could follow the receiver signal 900 of FIG. 9. The cards 520, 530 and 540 of FIG. 5, which each receive the UID call command from the reader 510, transfer their particular UIDs to the reader as the signals 1020, 1030 and 1040, respectively. Each card transfers each of its UID bytes to the reader in the shape of a positive pulse. The signals 1020, 1030 and 1040 each begin with an SOF, followed by the first through fourth UID bytes for the respective card and an EOF. Thus, the UID of Card 1 is 96h, B4h, B4h, A9h; the UID of Card 2 is 64h, 50h, 50h, 10h; and the UID of card 3 is 96h, 78h, 78h, 12h. The reader 510 recognizes whether more than one card approaches the reader by counting the positive pulses. That is, for the exemplary four-byte UIDs, the reader expects exactly four positive pulses if a single card approaches, but five or more pulses for multiple cards since at least one byte of the UID will be different for other cards.

Figure 11:
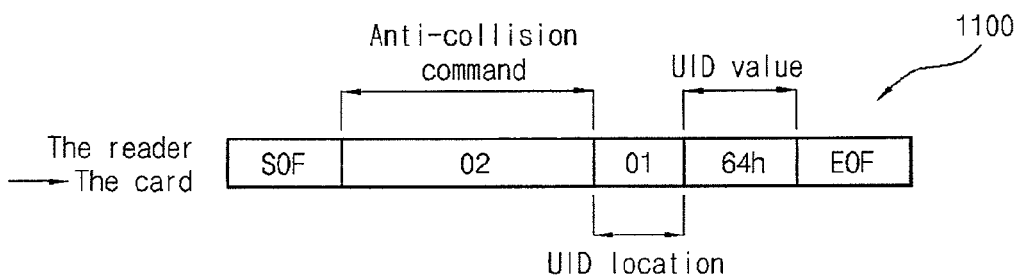
FIG. 11 shows a schematic signal diagram for an anti-collision command from the reader to a selected card in accordance with FIG. 10.

Turning to FIG. 11, a signal for an anti-collision command from the reader to a selected card is indicated generally by the reference numeral 1100. This receiver signal could follow the card signals 1000 of FIG. 10. The signal indicates how the reader 510 of FIG. 5 calls the corresponding card by selecting one of the first UID bytes (e.g., 64h or 96h) for the cards 520, 530 or 540. The reader transfers the anti-collision command "02" and the UID byte location "01" and the UID value 64h to the card.

Figure 12:
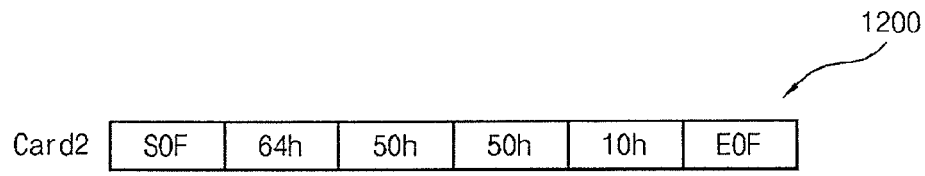
FIG. 12 shows a schematic signal diagram for a response from the selected card to the reader in accordance with FIG. 11.

Turning now to FIG. 12, a signal for a response from the selected card to the reader is indicated generally by the reference numeral 1200. This card signal could follow the receiver signal 1100 of FIG. 11. The signal 1200 shows that Card 2 or 530 of FIG. 5 sends an SOF followed by a first UID byte of 64h in response to the reader's call signal 1100 of FIG. 11. The card 530 responds to the call of the reader and transfers its UID bytes consecutively each in the shape of a positive pulse after receiving the anti-collision command "02", the UID location "01" and the matching first UID byte value of 64h.

Figure 13:
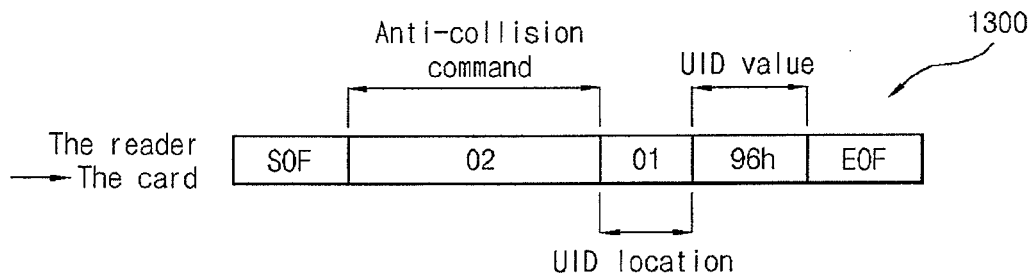
FIG. 13 shows a schematic signal diagram for an anti-collision command from the reader to selected cards in accordance with FIG. 10.

As shown in FIG. 13, a signal for an anti-collision command from the reader to selected cards is indicated generally by the reference numeral 1300. This receiver signal could follow the card signals 1000 of FIG. 10. The signal 1300 includes an SOF, the anti-collision command "02", the UID byte location "01" indicating the first UID byte, the first UID byte value of 96h, and an EOF. The signal 1300 may occur when the reader 510 of FIG. 5 fully identifies one card (i.e., Card 2 or 530 of FIG. 5) and then calls another first byte of 96h. Thus, the reader transfers the anti-collision command specifying the first UID byte location and the first UID byte value of 96h to the matching cards.

Figure 14:
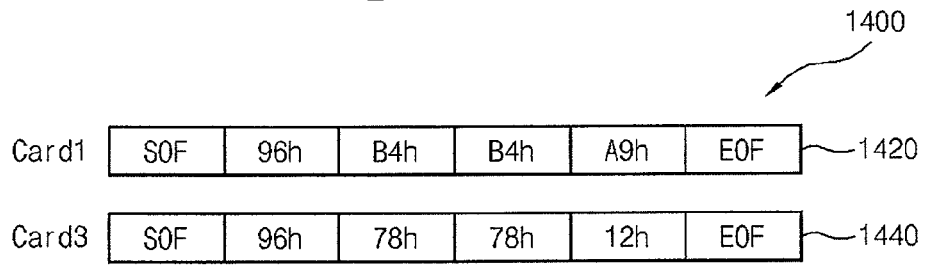
FIG. 14 shows a schematic signal diagram for responses from the selected cards to the reader in accordance with FIG. 13.

Turning to FIG. 14, signals for responses from the selected cards to the reader are indicated generally by the reference numeral 1400. These card signals could follow the receiver signal 1300 of FIG. 13. The response signals 1400 include a response signal 1420 from Card 1 or 520 of FIG. 5, and a response signal 1440 from Card 3 or 540 of FIG. 5. Each of the response signals begins with an SOF and has the same first UID byte value of 96h. The two cards each correspond to the first UID byte of 64h that the reader 510 calls, thus each of these two cards responds to the reader and transfers its respective UID bytes in shape of a positive pulse per byte immediately after receiving the anti-collision command "02", the UID byte location "01" and the first UID byte value of 64h.

Figure 15:
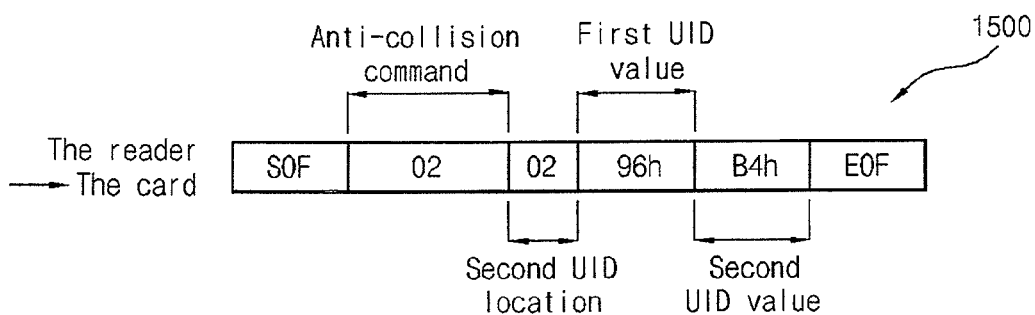
FIG. 15 shows a schematic signal diagram for a second anti-collision command from the reader to the selected card in accordance with FIG. 14.

Turning now to FIG. 15, a signal for a second anti-collision command from the reader to the selected card is indicated generally by the reference numeral 1500. This receiver signal could follow the card signals 1400 of FIG. 14. The signal 1500 includes an SOF, the anti-collision command "02", the UID location "02" indicating the number of UID bytes specified, the first UID byte value of 96h, the second UID byte value of B4h, and an EOF. The reader 510 of FIG. 5 transfers the anti-collision command, the highest UID byte location, and the first and second UID byte values of 96h and B4h, respectively, to the cards 520 and 540 in order to discern between these two cards having the same first UID byte value of 96h.

Figure 16:
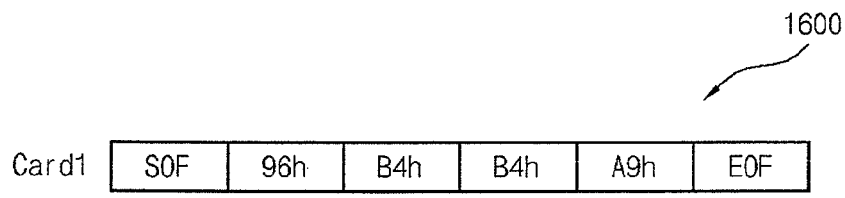
FIG. 16 shows a schematic signal diagram for a response from the selected card to the reader in accordance with FIG. 15.

As shown in FIG. 16, a signal for a response from the selected card to the reader is indicated generally by the reference numeral 1600. This card signal could follow the receiver signal 1500 of FIG. 15. The card signal 1600 includes a SOF, the first through fourth UID bytes of 96h, B4h, B4h, and A9h, respectively, and an EOF. Thus, Card 1 or 520 of FIG. 5 responds to the reader because it corresponds to the first and the second UID bytes of 96h and B4h that the reader selects. Card 1 responds to the reader and transfers its particular UID bytes in the shape of a positive pulse per byte after receiving the anti-collision command "02", the greatest UID byte location "02" and the first and second UID byte values of 96h and B4h, respectively.

Figure 17:
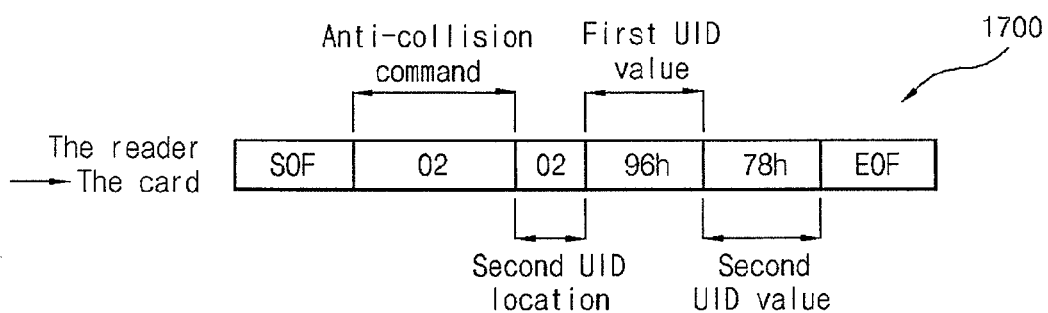
FIG. 17 shows a schematic signal diagram for a second anti-collision command from the reader to the selected card in accordance with FIG. 14.

Turning to FIG. 17, a signal for a second anti-collision command from the reader to the selected card is indicated generally by the reference numeral 1700. This receiver signal could follow the card signals 1400 of FIG. 14. The signal 1700 includes an SOF, the anti-collision command "02", the UID location "02" indicating the number of consecutive UID bytes specified, the first UID byte value of 96h, the second UID byte value of 78h, and an EOF. The signal 1700 is used by the reader 510 of FIG. 5 to identify another card, where the reader calls another second byte, this time 78h. Thus, the reader transfers to the cards the anti-collision command "02" and the highest UID byte location "02" and the first and the second UID byte values of 96h and 78h, respectively.

Figure 18:
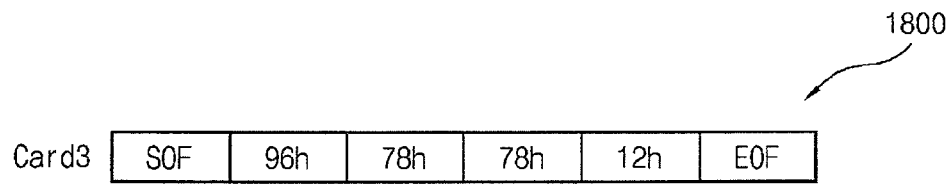
FIG. 18 shows a schematic signal diagram for a response from the selected card to the reader in accordance with FIG. 17.

Turning now to FIG. 18, a signal for a response from the selected card to the reader is indicated generally by the reference numeral 1800. This card signal could follow the receiver signal 1700 of FIG. 17. The card signal 1800 includes a SOF, the first through fourth UID bytes of 96h, 78h, 78h, and 12h, respectively, and an EOF. Thus, the Card 3 or 540 of FIG. 5 responds to the reader because it is the one corresponding to the first and the second UID bytes of 96h and 78h, respectively, that the reader selects and calls. Card 3 responds to the reader and transfers its UID bytes in shape of a positive pulse for each byte immediately after receiving the anti-collision command "02", the number of UID byte locations "02", and the first and second UID byte values of 96h and 78h, respectively. These and other features and advantages of the present disclosure may be readily ascertained by one of ordinary skill in the pertinent art based on the teachings herein. For example, it shall be understood that the teachings of the present disclosure may be extended to UIDs having an arbitrary number of bytes, or to UIDs that are randomly generated on the fly. The features of positive pulse detection and byte-wise comparison are useful for collision prevention.

It is to be understood that the teachings of the present disclosure may be implemented in various forms of hardware, software, firmware, special purpose processors, or combinations thereof. Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method of detecting at least one contactless device that has a unique identification code (UID), the method comprising:

requesting transfer of a UID;

receiving at least one positive pulse indicative of a UID; and detecting whether more than one UID was transferred if the number of positive pulses received exceeds the number expected for one UID, wherein when more than one UID was detected, the method further comprising:

selecting a first UID byte from UID bytes determined from the received positive pulses;

requesting transfer of a UID having the selected first UID byte;

receiving at least one positive pulse indicative of a UID; and detecting whether more than one UID having the selected first UID byte was transferred if the number of positive pulses received exceeds the number expected for one UID, wherein when more than one UID having the selected first UID byte was detected, the method further comprising:

selecting a second UID byte from UID bytes determined from the received positive pulses;

requesting transfer of a UID having the selected first UID byte and the selected second UID byte;

receiving at least one positive pulse indicative of a UID; and detecting whether more than one UID having the selected first UID byte and the selected second UID byte was transferred if the number of positive pulses received exceeds the number expected for one UID.

2. The method as defined in claim 1, wherein the UID comprises at least one byte, each byte being received in the shape of a positive pulse.

3. The method as defined in claim 1, wherein after one UID was transferred, the method further comprising activating the device corresponding to the transferred UID.

4. The method as defined in claim 1, wherein after one UID having the selected first UID byte was transferred, the method further comprising activating the card corresponding to the transferred UID.

5. The method as defined in claim 1, wherein after one UID having the selected first UID byte and the selected second UID byte was transferred, the method further comprising activating the card corresponding to the transferred UID.

6. The method as defined in claim 1, wherein after more than one UID having the selected first UID byte and the selected second UID byte was detected, the method further comprising:
   selecting another UID byte from the received UID bytes;
   requesting transfer of a UID having the selected first UID byte and the selected second UID byte and the selected other UID byte;
   receiving at least one positive pulse indicative of a UID; and
   detecting whether more than one UID having the selected first UID byte and the selected second UID byte and the selected other UID byte was transferred if the number of positive pulses received exceeds the number expected for one UID.

7. The method as defined in claim 6, wherein after one UID having the selected first UID byte and the selected second UID byte and the selected other UID byte was transferred, the method further comprising activating the card corresponding to the transferred UID.

8. A contactless card reader, comprising:
   a transmitter for transmitting an anti-collision command indicative of at least one desired identifier byte;
   a receiver for receiving a unique identifier as byte-wise positive pulses if the at least one desired identifier byte matches at least one corresponding byte of the unique identifier;
   a detector in signal communication with the receiver for detecting a collision when the number of positive pulses exceeds the number of bytes in the unique identifier;
   a caller in signal communication with the transmitter for calling all contactless cards within a given range of the reader;
   a memory in signal communication with the receiver for storing in an ordered byte-wise manner all unique identifier bytes received in response to the caller; and
   an anti-collision commander in signal communication with the memory and the transmitter for issuing the anti-collision command to differentiate between multiple contactless cards,
   wherein the memory is configured as a top matrix having a separate column and row for each byte of a unique identifier and having an additional row for each non-duplicate byte entry in any column.

9. The contactless card reader as defined in claim 8, wherein the caller calls all contactless cards within a given range of the reader at a periodic interval.

10. The contactless card reader as defined in claim 8, wherein the caller calls all contactless cards within a given range of the reader in response to a passive indication of at least one card.

11. The contactless card reader as defined in claim 8, wherein the detector fills in all remaining rightmost byte values for a row with the byte values of a unique identifier for a given card whenever a collision is not detected.

12. The contactless card reader as defined in claim 8, wherein the detector fills in one leftmost of the remaining byte values for a row with a commanded byte value of a unique identifier for a given card whenever a collision matches the existing byte and position.

13. An anti-collision coupling method for contactless cards, the method comprising:
   requesting that the cards transmit their unique identifiers, wherein each unique identifier comprises a fixed plurality of bytes;
   receiving the unique identifiers from each of the cards simultaneously as byte-wise positive pulses;
   counting the received positive pulses;
   determining that more than one card responded if the number of received positive pulses exceeds the fixed plurality of bytes;
   initializing a byte position counter;
   setting a byte value to a byte value received in the first byte position of the unique identifiers;
   forming an anti-collision command having the byte position counter and the byte value;
   i) transmitting the anti-collision command comprising the byte position counter and at least one byte value to the cards;
   ii) receiving the unique identifiers simultaneously as byte-wise positive pulses;
   iii) counting the received positive pulses; and
   iv) determining if more than one card responded if the number of received positive pulses exceeds the fixed plurality of bytes.

14. The anti-collision coupling method as defined in claim 13, further comprising, if more than one card responded:
   incrementing the byte position counter;
   setting the byte value to a byte value received in the incremented byte position of the unique identifiers;
   updating the anti-collision command by updating the byte position counter and adding the byte value; and
   repeating the steps i)-iv) of claim 13.

15. The anti-collision coupling method as defined in claim 13, further comprising, if only one card responded:
   determining that the reader has not called all of the unique identifier bytes corresponding to the current byte position counter;
   setting the byte value to another byte value received in the first byte position of the unique identifiers;
   updating the anti-collision command with the current byte value; and
   repeating the steps i)-iv) of claim 13.

16. The anti-collision coupling method as defined in claim 13, further comprising, if only one card responded:
   determining that the reader has called all of the unique identifier bytes corresponding to the current byte position counter; and
   activating the called cards corresponding to the received unique identifiers.

* * * * *